July 26, 1955 N. H. STARK 2,713,743
RELEASABLE SINKER
Filed Dec. 13, 1952
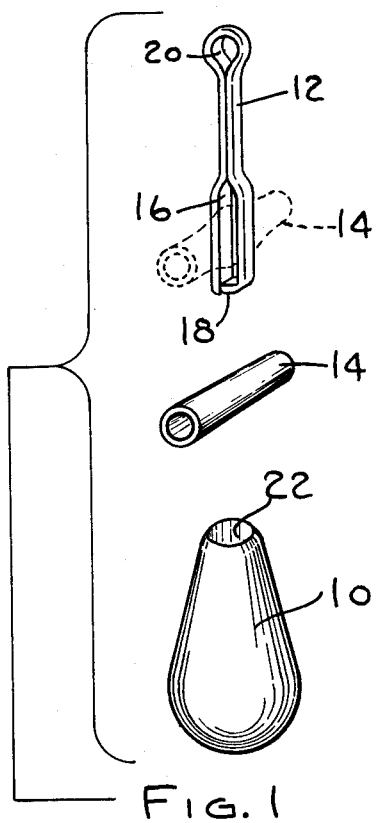
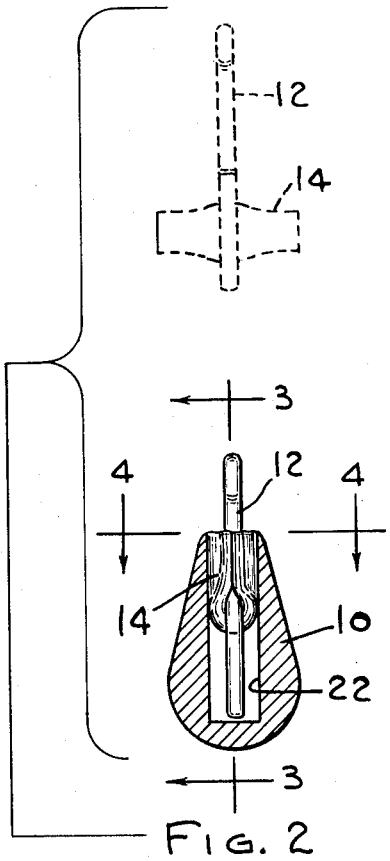
FIG. 1
FIG. 2
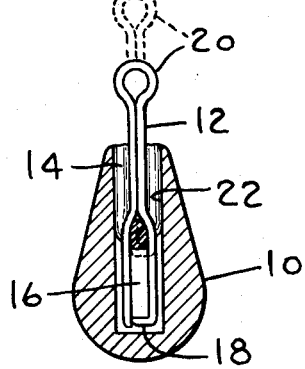
FIG. 3
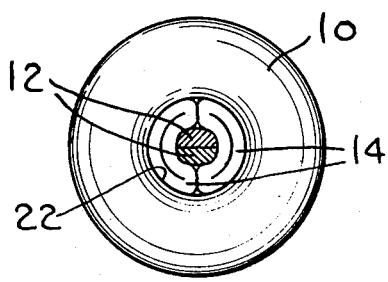
FIG. 4
INVENTOR.
NORMAN H. STARK
BY
John W. Michael
ATTORNEY

2,713,743
RELEASABLE SINKER

Norman H. Stark, Cedarburg, Wis.

Application December 13, 1952, Serial No. 325,851

4 Claims. (Cl. 43—43.12)

This invention relates to sinkers for fishing and particularly to a sinker which may be released from the fishing line.

In fishing, the sinker attached to the line occasionally gets caught on an object in the water. In such an event the usual practice is to attempt to free the sinker by various maneuvers. If the maneuvers fail the line must be cut or broken as close to the sinker as possible. Of course this results in the loss of some line, the sinker, leader, and the bait. The present sinker may be released when caught so the only loss is the sinker itself. Sinkers having this object in view have been proposed in the past but have been impractical since the release mechanism, which must release at low forces, released when subjected to normal high shock forces encountered in casting, etc. The present sinker is releasable at low sustained forces but will not release when subjected to a sudden high force. The magnitude of the sustained force required to release the sinker may be varied as indicated by the strength of the line in use, etc. An incidental feature of this invention is the ease with which sinkers of different sizes may be intechanged without the necessity of untying or tying knots.

The principal object of this invention is to provide a releasable sinker.

Another object is to provide a sinker which may be released with low sustained forces but which will hold when subjected to sudden forces well in excess of the releasing force.

A further object is to provide a releasable sinker mechanism in which the force required to release the sinker may be varied.

Still another object is to provide a low cost releasable sinker which can compete favorably with conventional sinkers.

Other objects and advantages will be pointed out in, or be apparent from, the specification and claims, as will obvious modifications of the single embodiment shown in the drawings, in which:

Fig. 1 is an exploded perspective showing the various parts and the rubber tube in dotted lines in its assembled position as well as in full lines;

Fig. 2 is a central longitudinal sectional view showing the sinker assembled in full lines and the pin and tube separated from the sinker in dotted lines, the pin and tube being shown in full;

Fig. 3 is a section of Fig. 2 taken on line 3—3 and shows a dotted line position of the pin to depict the limits of movement afforded by the elongated slot in the pin, the pin being shown in full; and Fig. 4 is a section taken on line 4—4 in Fig. 2.

Considering the drawings in detail, the assembly includes but three parts, the sinker 10, pin 12, and rubber member or tube 14. The pin may be fabricated in any desired manner but is shown as a cotter pin shaped to provide an elongated slot 16 closed at the lower end by ear 18. A section of rubber tubing 14 of greater outside diameter than the width of slot 16 is pulled about half way through slot 16 (as may be seen in dotted lines in Figs. 1 and 2). The tendency of the tube to return to its normal shape holds the tube in the slot. The eyelet 20 at the head of the pin may be attached to the line.

With the rubber tube assembled in the pin as outlined above the pin is inserted in the blind hole 22 in sinker 10. As the pin progresses into the hole tube 14 is forced toward the top of the slot and is finally caused to fold upwardly around the pin until the pin has entered the hole as far as possible. It will be noted that the deformed tube fits in the hole snugly. In fact the tube must stretch slightly to fit in the hole. It will be apparent, therefore, that the tube frictionally engages the walls of the hole.

Referring now to Fig. 4 it will be noted the tube has more or less wrapped around the shank of pin 12 to seal the bottom of the hole from the exterior of the sinker. When the sinker is held and a force applied to the pin the tube will, of course, tend to press and deform against the wall of the hole and at the same time tend to increase the seal. This increases the frictional engagement and tends to "draw a vacuum," thus resisting removal of the pin and tube. A sudden, sharp force increases the friction greatly and the rubber dissipates the energy while a lesser steady force will pull the pin out. A large sustained pull will, of course, effect removal of the pin.

With the above comments in mind it will be apparent that the present sinker will not pull off the line when subjected to a sudden sharp force in excess of that necessary to pull the pin if sustained. Therefore the sinker will stay on the line when casting and the reel is "thumbed," subjecting the sinker to a momentary high pull. If the sinker gets snagged the line may be "jerked" in an attempt to free the sinker without losing it. If this fails the line may be pulled steadily to pull the pin and tube from the sinker. The sinker is lost but the rest of the tackle is recovered.

The diameter of the hole may be decreased to increase the required pull-out force and vice versa. I presently prefer a pull-out force in the neighborhood of eight pounds but further experience may indicate an upward or downward revision.

The pull-out force may be varied somewhat for a given assembly by varying the distance the pin and rubber tube are inserted in the hole. Thus a lesser pull-out force will be required when the pin is inserted only a short distance. The pull-out force may be increased by using a longer tube with a pin having a shorter slot to secure full insertion of the tube. Of course the diameter of the hole will affect the pull-out force also.

A further advantage of the present construction is the ease with which the sinker size may be changed. The sinkers may be provided in a series of sizes (weights) having holes of the same diameter and the user may change from one to another by merely pulling the pin and inserting it in the desired sinker. Thus the fisherman may change sinkers to vary the fishing depth rapidly without tying knots and so forth. This feature, together with the ability to release the sinker when necessary, makes it possible to enjoy more fishing in a given period of time.

Considering the construction again for a moment, it should be noted that the provision of slot 16 in pin 12 greatly increases the life of the rubber tube 14 over the life when the tube is not free to move with respect to the pin. Apparently the small rolling action afforded by the slot prevents tearing the rubber. The rubber tube is preferred since, as may be seen in the drawings, it effects a good seal and is quite inexpensive. It will be appreciated, however, that this invention is not to

I claim:

1. A releasable sinker assembly comprising, a sinker having a blind hole therein, a pin having an elongated slot therein and projecting into the hole, and a resilient tube passing through said slot and lying against the pin in contact with the pin and the wall of the slot, the ends of the tube projecting away from the blind end of the hole.

2. A releasable sinker assembly comprising, a sinker having a blind hole therein, a pin adapted for connection to a line and provided with an elongated slot and projecting into the hole, a length of rubber tubing passing through said slot and folding upwardly around the sides of the pin as the pin is inserted in the hole to cooperate with the pin and wall to seal the space therebetween and to retain the pin in the hole, said tubing being stretched slightly when passed into the hole and being compressed when withdrawal of the pin is attempted.

3. A releasable sinker assembly comprising, a sinker having a hole therein, a pin adapted for connection to a line and projecting into said hole, a rubber tube carried by the pin and cooperating with the wall of the hole to retain the pin in the hole, the tube substantially filling the space between the pin and the wall when in place and the point of connection between the pin and tube being lowermost when the pin is in place so the tube is compressed between the pin and wall, said tube being deformed when a force is applied to the pin tending to withdraw the pin from the hole whereby withdrawal of the pin is resisted.

4. A releasable sinker assembly comprising, a sinker having a blind hole therein, a pin having an elongated slot therein and projecting into the hole and an elongated rubber member passing through said slot and lying against the pin in contact with the pin and the wall of the slot, the ends of the member projecting away from the blind end of the hole.

References Cited in the file of this patent

UNITED STATES PATENTS

| | | |
|---|---|---|
| 671,047 | Fox | Apr. 2, 1901 |
| 1,232,167 | Arnold | July 3, 1917 |
| 1,564,147 | Stickley, et al. | Dec. 1, 1925 |
| 1,597,068 | Donald et al. | Aug. 24, 1926 |
| 1,817,775 | Sipe | Aug. 4, 1931 |
| 2,112,247 | McLoughlin | Mar. 29, 1938 |
| 2,326,876 | Miller | Aug. 17, 1943 |
| 2,594,620 | Braithwaite | Apr. 29, 1952 |

FOREIGN PATENTS

| | | |
|---|---|---|
| 157,461 | Germany | Dec. 28, 1904 |
| 510,542 | Germany | Oct. 20, 1930 |
| 657,460 | Great Britain | Sept. 19, 1951 |
| 909,924 | France | Jan. 10, 1946 |
| 1,011,186 | France | Apr. 2, 1952 |